US009670567B2

(12) United States Patent
    Jarry

(10) Patent No.: US 9,670,567 B2
(45) Date of Patent: Jun. 6, 2017

(54) MANUFACTURING METHOD OF MAKING ALUMINUM ALLOY SEMI-FINISHED PRODUCT WITH IMPROVED MICROPOROSITY

(75) Inventor: Philippe Jarry, Grenoble (FR)

(73) Assignee: CONSTELLIUM ISSOIRE, Issoire (FR)

( * ) Notice: Subject to any disclaimer, the term of this patent is extended or adjusted under 35 U.S.C. 154(b) by 1488 days.

(21) Appl. No.: 13/398,691

(22) Filed: Feb. 16, 2012

(65) Prior Publication Data

US 2012/0237395 A1    Sep. 20, 2012

Related U.S. Application Data

(60) Provisional application No. 61/444,274, filed on Feb. 18, 2011.

(30) Foreign Application Priority Data

Feb. 18, 2011    (FR) ...................... 11 00505

(51) Int. Cl.
    *B22D 1/00*     (2006.01)
    *C22C 21/00*    (2006.01)
    (Continued)

(52) U.S. Cl.
    CPC ............... *C22C 21/00* (2013.01); *B22D 1/00* (2013.01); *C22B 9/026* (2013.01); *C22B 21/06* (2013.01); *C22F 1/04* (2013.01); *Y02P 10/234* (2015.11)

(58) Field of Classification Search
    CPC ........ B22D 1/00; B22D 11/003; B22D 1/114; B22D 27/08; B22D 11/124; B22D 11/00; B22D 27/02; C22B 21/06
    See application file for complete search history.

(56) References Cited

U.S. PATENT DOCUMENTS 4,546,059 A    10/1985    Ong et al.
5,772,800 A     6/1998    Heinz et al.
                (Continued)

FOREIGN PATENT DOCUMENTS

AU         765961 B2    10/2003
CA       2414564 A1 *    8/2003    ........... G01N 33/206
                (Continued)

OTHER PUBLICATIONS

'Aluminum and Aluminum Alloys', ASM International, 1993, p. 20-24,529.*
                (Continued)

*Primary Examiner* — Roy King
*Assistant Examiner* — Janelle Morillo
(74) *Attorney, Agent, or Firm* — McBee Moore Woodward & Vanik IP LLC

(57) ABSTRACT

The invention relates to a manufacturing method for making an unwrought semi-finished product having at mid thickness a density of micropores of size greater than 90 μm less than 50% and preferably less than 20% of the density of micropores of size greater than 90 μm obtained by a method according to prior art. The method according to the invention comprises in particular an ultrasound treatment step for the molten metal bath in a furnace and/or a vessel using an immersed device comprising at least one ultrasound transmitter. The semi-finished products obtained according to the method of the invention are particularly advantageous for manufacturing by rolling sheets designed for the aircraft industry to produce spars, ribs, upper and lower wing skins and for manufacturing by extrusion sections designed for the aircraft industry to produce stiffeners.

3 Claims, 3 Drawing Sheets

(51) Int. Cl.
  *C22B 9/02*    (2006.01)
  *C22B 21/06*   (2006.01)
  *C22F 1/04*    (2006.01)

(56) References Cited

U.S. PATENT DOCUMENTS

2007/0235159 A1    10/2007  Han et al.
2011/0247456 A1*   10/2011  Rundquist ............... C21C 7/072
                                                        75/392

FOREIGN PATENT DOCUMENTS

| CH | 669795      |    | 4/1989  |
|----|-------------|----|---------|
| EP | 0027052     | A1 | 4/1981  |
| EP | 0300136     | A2 | 1/1989  |
| FR | 1137785     | A  | 6/1957  |
| WO | 8505449     | A1 | 12/1985 |
| WO | 9319873     | A2 | 10/1993 |
| WO | 00/65109    |    | 11/2000 |
| WO | 2011127402  | A1 | 10/2011 |

OTHER PUBLICATIONS

Written Opinion and Search Report in French Application 1100505 (10 pages).

\* cited by examiner

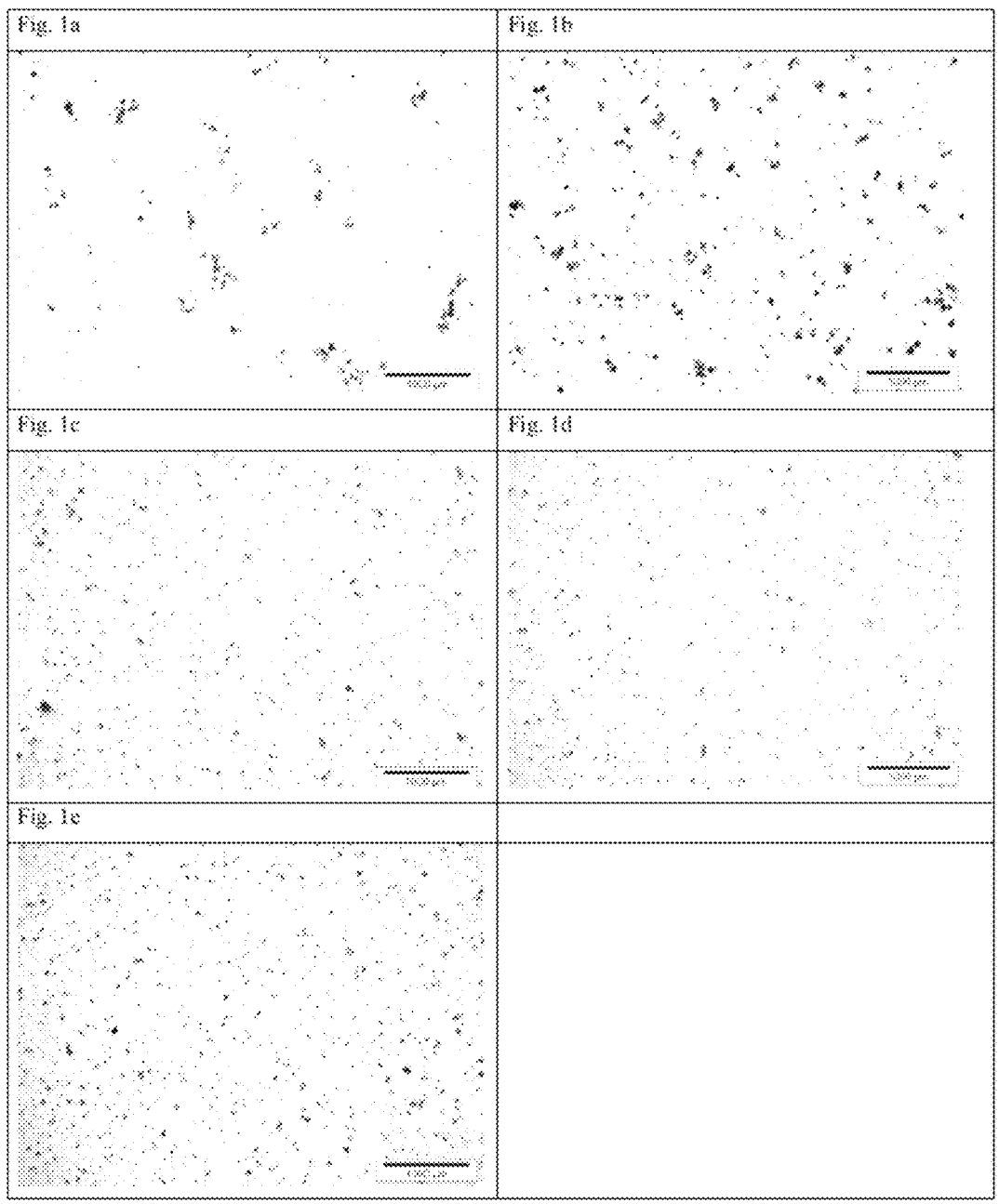

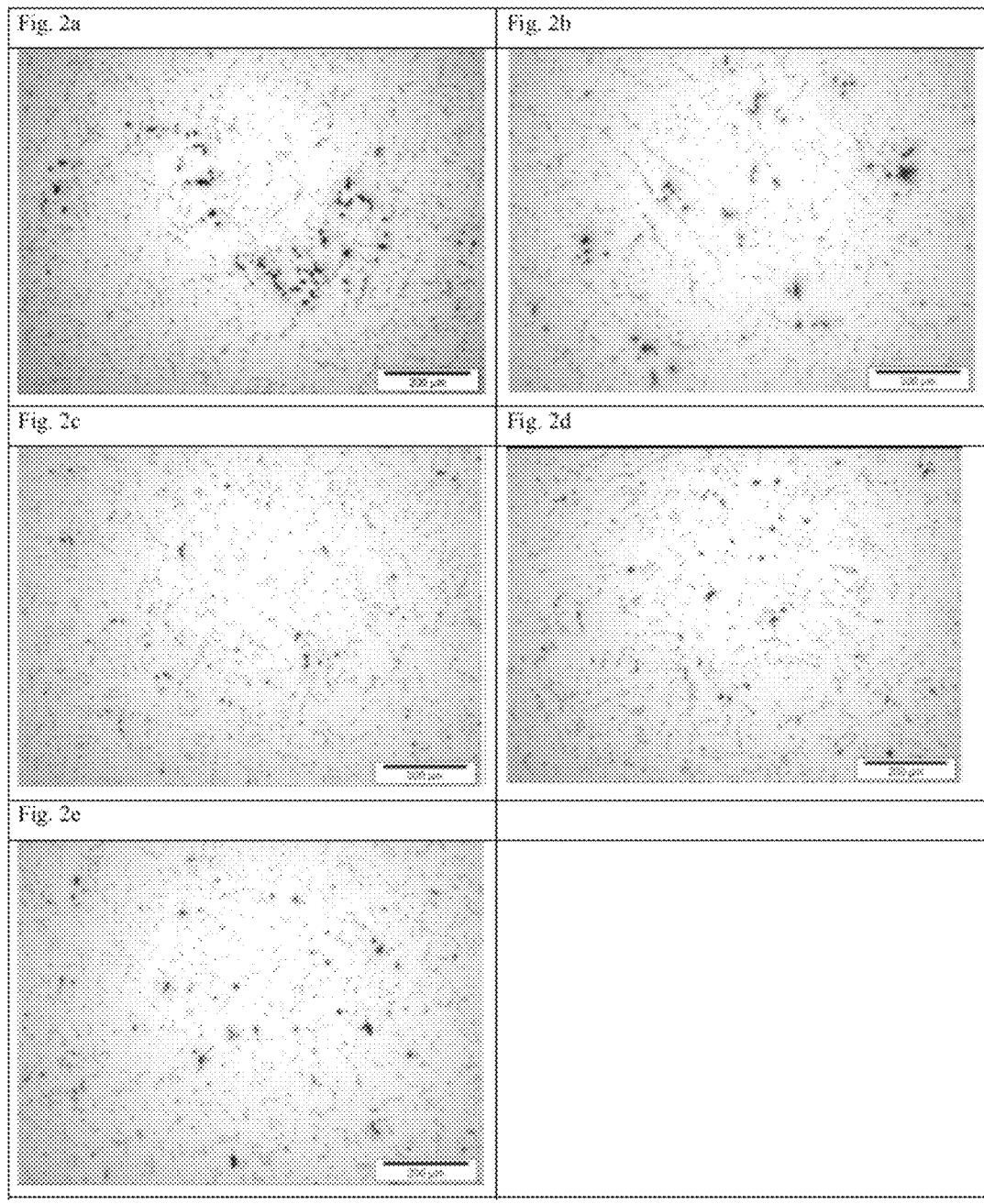

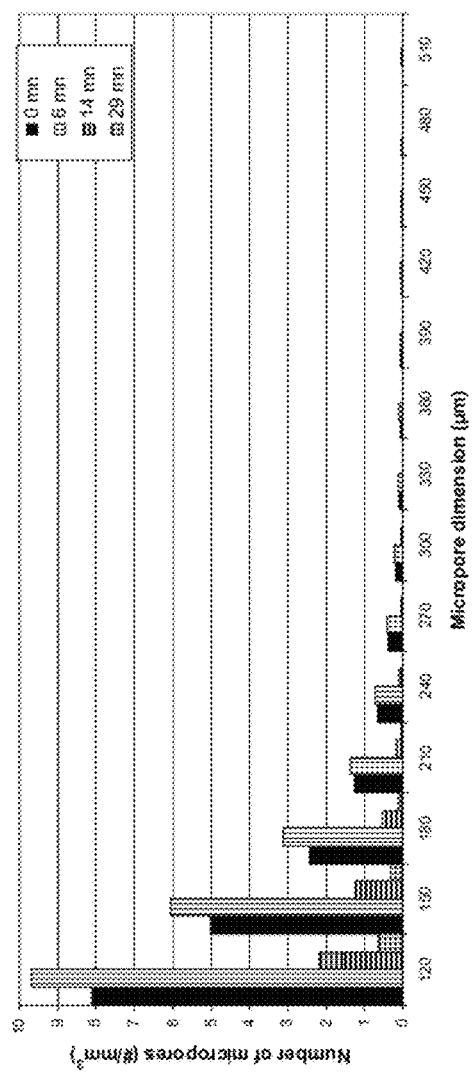

MANUFACTURING METHOD OF MAKING ALUMINUM ALLOY SEMI-FINISHED PRODUCT WITH IMPROVED MICROPOROSITY

CROSS REFERENCE TO RELATED APPLICATIONS

This application claims priority to FR1100505 filed Feb. 18, 2011 and U.S. Provisional Ser. No. 61/444,274 filed Feb. 18, 2011, the contents of which are both incorporated herein by reference in their entireties.

BACKGROUND

Field of the Invention

The invention relates to semi-finished products made of aluminum alloy manufactured by vertical direct chill semi-continuous casting such as rolling slabs and extrusion billets, more particularly, such semi-finished products, their manufacturing methods and use, designed in particular for aeronautical and aerospace engineering.

Description of Related Art

Aluminum alloy plates and thick sections are used in particular in the aeronautical and aerospace engineering industry. These products are obtained in general by a method including vertical semi-continuous casting of a semi-finished product, rolling slab or extrusion billet, optionally the homogenization, hot working by rolling or extrusion, solution heat treatment and quenching of an aluminum alloy. The most frequently used alloys are alloys of series 2XXX, series 7XXX and certain alloys of series 8XXX containing lithium.

These products must in particular possess certain customary properties in particular in terms of the compromise between static mechanical resistance properties (tensile and compression yield stress, breaking strength) and damage tolerance properties (fracture toughness, resistance to fatigue crack propagation), these properties being in general contradictory.

It is known that damage tolerance properties may be influenced in particular by the presence in thick products of non-metallic inclusions and microporosity.

Micropores appear during slab casting and are then partially or completely filled by the rolling process. It is therefore attempted to eliminate micropores greater than approximately 90 μm which prove particularly detrimental for damage tolerance.

U.S. Pat. No. 5,772,800 describes a method for obtaining plates of thickness greater than 50 mm characterized by a density of micropores of size greater than 80 μm of less than 0.025 micropores per cm2 and a microporosity volume for the slab of less than 0.005%, in which the hot rolling conditions and the reduction ratios are adapted according to the radius of the hot rolling cylinder.

This method requires special tools for hot rolling and in certain cases, depending on the tools available and the thicknesses sought after, it is not possible to attain the transformation conditions that would allow the porosities to be filled efficiently.

It is therefore desirable to obtain, as of the casting stage, a semi-finished product with a low density of large-sized micropores and a low microporosity volume.

It is generally accepted that degassing of the molten metal makes it possible to decrease the quantity of micropores in particular by decreasing the hydrogen content. The hydrogen content in the molten metal is measured, for example, using a probe of the Telegas™ or Alscan™ type, known to those skilled in the art.

Known methods for decreasing the hydrogen content are, for example, treatment in a degassing ladle using a rotor by introducing chlorine and/or argon. The use of ultrasonic emissions to degas the molten metal is also known.

Patent application CH 669.795 describes, for example, the introduction of ultrasonic heads into a conveying trough from a furnace to a foundry so as to obtain degassing.

Patent application US2007/235159 describes apparatus and a method in which an ultrasonic vibration is used to degas the molten metal in the presence of a purge gas such as argon or nitrogen.

International application WO00/65109 describes a device for injecting gas bubbles into a molten metal, in which the diameter of the bubbles can be decreased using ultrasounds.

U.S. Pat. No. 4,546,059 describes a method for continuous casting of light-alloys wherein ultrasound treatment is carried out in a solidification device optionally in an area separated from the solidification front by a porous material. This method results simultaneously in the formation of a uniform sub-dendritic structure, lowering of hydrogen content and reduction of porosity. To position the ultrasound head in the solidification device is not convenient.

The reduction in the hydrogen content proves to be difficult to obtain and depends on external conditions such as ambient moisture. It would therefore be advantageous, for a constant hydrogen content, to be able to limit the presence of large-sized micropores.

Moreover, one of the consequences of later heat treatments of the solidified metal, in particular including homogenization, generally necessary for metallurgical reasons, is to increase the dimension of micropores.

Last, a simplified method, alternative to existing methods which are often difficult to carry out would be advantageous.

There exists a need, for an improved method to obtain unwrought semi-finished aluminum alloy products such as rolling slabs or extrusion billets, in particular made of alloy 2XXX or 7XXX, having a low density of micropores of size greater than approximately 90 μm, in particular in the homogenized state, and for a device to carry out such a method.

SUMMARY

A first subject of the present invention was to provide a manufacturing method for an unwrought aluminum alloy semi-finished product such as a rolling slab or extrusion billet. The method includes:
(i) preparing a molten metal bath of an alloy whose composition, as a percentage by weight is:
Zn: 0-12
Cu: 0-6
Mg: 0-6
Li: 0-3
Ag: 0-1
Si<0.5
Fe<0.5
optionally at least one of Cr, Zr, Mn, Hf, Ti, Sc, V, B, with a content<0.5,
the rest aluminum,
(ii) ultrasound treatment of said molten metal bath in a furnace and/or a vessel using an immersed device comprising at least one ultrasound transmitter,
(iii) transfer of said molten metal bath so treated to a solidification device, (iv) vertical direct chill semi-continuous casting of said treated molten metal bath.

A second subject of the present invention was the provision of a facility for vertical direct chill semi-continuous casting including at least one furnace necessary for melting the metal and/or for keeping it at a given temperature and/or for operations for preparing the molten metal and adjusting the composition, at least one vessel designed to perform a treatment to remove impurities that are dissolved and/or in suspension in the molten metal, a device for solidifying the molten metal by vertical direct chill semi-continuous casting including at least one ingot mould, a bottom block, a device to move downwardly, at least one device for procuring the molten metal and a cooling system, these various furnaces, pots and solidification devices being connected to each other by troughs in which the molten metal can be transported, characterized in that said installation also includes at least one immersed device comprising at least one ultrasound transmitter positioned in a furnace and/or a vessel.

BRIEF DESCRIPTION OF THE DRAWINGS

FIG. 1: Micrographs without chemical attack of the solidified, unhomogenized metal obtained after ultrasound treatment of various durations: FIG. 1a: 0 min, FIG. 1b: 2 min, FIG. 1c: 6 min, FIG. 1d: 14 min, FIG. 1e: 29 min.

FIG. 2: Micrographs without chemical attack of the solidified, unhomogenized metal obtained after ultrasound treatment of various durations: FIG. 2a: 0 min, FIG. 2b: 2 min, FIG. 2c: 6 min, FIG. 2d: 14 min, FIG. 2e: 29 min.

FIG. 3: Histogram of micropores dimensions after homogenization, obtained by X-ray tomography.

DETAILED DESCRIPTION OF A PREFERRED EMBODIMENT

The names of alloys follow the rules of The Aluminum Association, known to those skilled in the art. The chemical composition of standardized aluminum alloys is defined for example in standard EN 573-3. Unless otherwise specified, the definitions of European standard EN 12258-1 apply.

The problem of improving the method to make unwrought semi-finished products having a low density of micropores of size greater than approximately 90 µm is addressed by the use of a method including the steps of:
(i) preparing a molten metal bath of an alloy whose composition, as a percentage by weight is:
Zn: 0-12
Cu: 0-6
Mg: 0-6
Li: 0-3
Ag: 0-1
Si<0.5
Fe<0.5
optionally at least one of Cr, Zr, Mn, Hf, Ti, Sc, V, B, with a content<0.5, the rest aluminum,
(ii) ultrasound treatment of said molten metal bath in a furnace and/or a vessel using an immersed device comprising at least one ultrasound transmitter,
(iii) transfer of said molten metal bath so treated to a solidification device,
(iv) vertical direct chill semi-continuous casting of said treated molten metal bath.

The present inventor noted that, surprisingly, ultrasound treatment carried out upstream of casting makes it possible to decrease the dimension of micropores in solidified metal even if the hydrogen content and the grain structure are not modified. The present inventor did not observe any degassing effect related to the ultrasound treatment but rather, an effect on the dimension of the micropores. Although not attached to any particular theory, the present inventor thinks that this effect could be related to the later nucleation of micropores during solidification because of the better wetting of the inclusions by the molten metal in the presence of ultrasounds and to the fragmentation of said inclusions by the ultrasound treatment.

Surprisingly, an ultrasound treatment carried out very upstream from the solidification device, several minutes or several tens of minutes before casting, and which may have no or virtually no influence on either cast grain structure or hydrogen content, nevertheless enables to decrease microporosity of the cast product. Thus the dendritic structure of cast grains is maintained contrary to ultrasound treatments according to what the prior art teaches wherein an ultrasound treatment is carried out in a solidification device.

The preparation of the molten metal bath i.e. the adjustment of the composition of the alloy can be carried out according to methods known by those skilled in the art in an appropriate furnace. As known to the skilled person, other elements not mentioned may be present with a maximum content of 0.05 wt. % as impurities or minor additions.

The present invention is particularly advantageous for alloys whose Mg content is at least 0.1% by weight and/or whose Li content is at least 0.1% by weight. For this type of alloy, it is particularly difficult to obtain a low hydrogen content by means of conventional degassing processes and, in addition, because of their high oxidability, the inclusion content is generally high. But surprisingly, the present invention makes it possible to obtain a low density of micropores with a dimension greater than approximately 90 µm, even with a high hydrogen content. So preferably the method of the invention can be simplified compared to prior art methods in that there is no degassing step, the hydrogen content of the molten metal bath during solidification being at least 0.15 ml/100 g, preferably at least 0.25 ml/100 g and preferably still at least 0.30 ml/100 g.

The method according to the invention is particularly advantageous for alloys chosen from among AA2014, AA2017, AA2024, AA2024A, AA2027, AA2139, AA2050, AA2195, AA2196, AA2296, AA2098, AA2198, AA2099, AA2199, AA2214, AA2219, AA2524, AA5019, AA5052, AA5083, AA5086, AA5154, AA5182, AA5186, AA5383, AA5754, AA5911 AA7010, AA7020, AA7040, AA7140, AA7050, AA7055, AA7056, AA7075, AA7449, AA7450, AA7475, AA7081, AA7085, AA7910, AA7975.

The liquid metal undergoes ultrasound treatment in a furnace and/or a vessel (or "ladle") using an immersed device comprising at least one ultrasound transmitter. It is known, for example from ASM Specialty Handbook <<Aluminum and Aluminum Alloys, © 1993 page 530, that a vessel (or "ladle") is a non-porous container wherein the metal can stay for controlled duration which depends of its dimension, the vessel being located between the furnace and the solidification device and enabling a treatment such as filtering the molten metal through a filter medium in a "filtration ladle" or introducing into the bath a "treatment" gas which may be inert or reactive in a "degassing ladle". It is typically helpful and may be necessary for the treatment using the device comprising at least one ultrasound transmitter to be carried out in a part of the casting facility in which sufficient treatment time is possible, upstream of the solidification device and not in a transfer trough wherein the residence time is too small. Preferably, no treatment by means of a gas such as argon, chlorine or nitrogen is carried out simultaneously with the ultrasound treatment. In the same way, ultrasound treatment conditions generating acoustic streaming are preferably avoided. Gas treatment and/or acoustic streaming generate movements of metal carrying the oxides formed on the surfaces into the molten metal which is detrimental to the quality of the molten metal and the dimension of the micropores. The ultrasound transmitter is used preferably at a frequency ranging between 18 and 22 kHz.

The treatment time advisable and/or necessary to obtain the desired effect required on the microporosity depends particularly on the power of the ultrasound transmitter used and the amount of metal treated. The ultrasound treatment of a mass unit is preferably carried out at a total ultrasound power P for a length of time t such that the energy P×t is at least equal to a minimum energy per mass unit $E_{min}$. The minimum treatment time per mass unit is therefore $t_{min}=E_{min}/P$. The present inventor noted that a minimum amount of energy $E_{min}$ of 4 kJ/kg, preferably at least 10 kJ/kg, and preferably still at least 25 kJ/kg, could prove to be sufficient during the treatment of a quantity of 16 kg with no stirring of the molten metal. The present inventor believes that these minimum amounts of energy $E_{min}$ of 4 kJ/kg, preferably 10 kJ/kg and preferably still 25 kJ/kg, can be generalized in the majority of cases to greater quantities but could however be reduced still further in certain embodiments, for example by modifying the shape of the acoustic signal and/or by improving stirring of the molten metal, in order to reach a minimum amount of energy $E_{min}$ of 1 kJ/kg, or preferably 2 or 3 kJ/kg.

Preferably, the total power P is at least equal to 400 W and/or time t is at least equal to 60 s.

In one embodiment of the invention, the ultrasound treatment is carried out during casting, i.e. during the continuous flow in the molten metal solidification device, via a treatment vessel (or "ladle"). The vessel is advantageously dimensioned so that the average residence time of a mass unit is at least equal to $t_{min}$.

In another preferred embodiment of the invention, treatment using a device comprising at least one ultrasound transmitter is carried out before casting in a furnace. Advantageously, the molten metal is stirred by electromagnetic means so as to circulate within the volume excited by the ultrasound transmitter. An induction furnace can provide advantageous electromagnetic stirring, the frequency of the current used in the induction furnace can be adjusted to obtained a desired stirring.

These two embodiments can also be combined if desired for any reason.

It is advantageous that the molten metal bath is at a temperature at least equal to 690° C. and preferably at least 700° C. during the ultrasound treatment. The less viscous the molten metal, the more effective the ultrasound treatment.

In an embodiment wherein the ultrasound treatment is carried out in a furnace, the molten metal bath can advantageously be at a temperature at least equal to 740° C. and preferably at least 750° C. during the ultrasound treatment.

The transfer of the liquid metal bath so treated to the solidification device is carried out in at least one trough (or "chute"), indeed these various furnaces, vessels and solidification devices are connected to each other by troughs in which the molten metal can be transported.

The duration elapsing between the end of ultrasound treatment of the liquid metal bath and the introduction of the same liquid metal bath in the solidification device is at least a few minutes, typically at least three minutes, particularly when the ultrasound treatment is carried out in a vessel, or even at least a few tens of minutes, typically at least one hour, particularly when the ultrasound treatment is carried out in a furnace.

The method according to the present invention makes it possible, for a given hydrogen content in the molten metal, to decrease the density of large-size micropores, which is particularly advantageous for certain alloys, such as alloys containing at least 0.1% Mg and/or 0.1% Li, for which it is difficult to reduce the hydrogen content.

Within the context of the present invention, the dimension of a micropore is the maximum dimension of the smallest ellipsoid which contains the micropore.

The method according to the present invention may comprise any number of further and/or conventional steps for treating molten metal such as filtration and/or degassing; this treatment may involve filtering the molten metal through a filter medium in a "filtration ladle" or introducing a "treatment" gas which may be inert or reactive into the bath in a "degassing ladle".

The method according to the present invention can advantageously be carried out in a facility for vertical direct chill semi-continuous casting including at least one furnace necessary for melting the metal and/or for keeping it at a given temperature and/or for operations for preparing the molten metal and adjusting the composition, at least one vessel designed to perform a treatment to remove impurities that are dissolved and/or in suspension in the molten metal, a device for solidifying the molten metal by vertical direct chill semi-continuous casting including at least one ingot mould, a bottom block, a device to move downwardly, at least one device for procuring the molten metal and a cooling system, these various furnaces, vessels and solidification devices being connected to each other by troughs in which the molten metal can be transported, characterized in that it also includes at least one immersed device comprising at least one ultrasound transmitter positioned in a furnace and/or a vessel.

Advantageously, in the casting facility according to the present invention, the device including an ultrasound transmitter is positioned in an induction furnace.

The unwrought semi-finished products obtained by a method according to the present invention advantageously have at mid thickness, a density of micropores of size greater than 90 µm less than 50% and preferably less than 20% of the density of micropores of size greater than 90 µm obtained by an identical method but not including ultrasound treatment step (ii).

The semi-finished products obtained with the method according to the present invention are particularly advantageous because even when their hydrogen content is high, the density of large-size micropores is particularly low.

In addition, semi-finished products obtained with the method according to the present invention are particularly advantageous in a homogenized state because they also have in this state, for which an increase in the dimension of micropores is typically to be observed, a particularly low density of large-size micropores. The homogenization treatment is thermal treatment of the unwrought semi-finished product resulting from casting, which is carried out before hot working, at high-temperature, typically at a temperature greater than 450° C., the temperature depending on the alloy in question. During homogenization, micropores tend to coalesce and therefore the maximum volume of micropores tends to increase, and similarly their dimension tends to increase even though homogenization also encourages spheroidizing that is a reduction of the surface/volume ratio.

Homogenization makes it possible to improve the metallurgical properties of the products, and is therefore particularly advantageous for obtaining a homogenized product with a low large-diameter micropores density.

Surprisingly, then, the semi-finished products obtained with the method according to the invention, optionally in a homogenized state, and whose hydrogen content is greater than 0.15 ml/100 g, or even at least 0.25 ml/100 g or even still at least 0.30 ml/100 g have a density of micropores of size greater than 90 µm less than 10/mm$^3$ and preferably less than 5/mm$^3$.

Semi-finished products obtained with the method according to the invention with a lithium content of at least 0.1% by weight and preferably at least 0.8% by weight are particularly advantageous.

As it is tricky to measure the hydrogen content in the solid, it is considered, within the context of this invention, that a satisfactory approximation of the hydrogen content in the solid product is obtained by measuring the hydrogen content in the molten metal just before casting, by known methods such as Telegas™ or l'Alscan™.

The semi-finished products obtained with the method according to the invention are particularly useful for applications in which the damage tolerance and in particular the fatigue strength of the products are great. The semi-finished products obtained with the method according to the invention are therefore used in particular for manufacturing by rolling plates designed for the aircraft industry to produce spars, ribs, upper and lower wing skins and for manufacturing by extrusion sections designed for the aircraft industry to produce stiffeners. Preferably, the semi-finished products obtained with the method according to the invention are used for the manufacture of products obtained with low work-hardening and/or insufficiently compressive work-hardening such as products for which the ratio between the thickness of the semi-finished product and the thickness of the product after work-hardening is less than 4 or preferably 3.5 or 3. The semi-finished products obtained with the method according to the present invention are, then, advantageous for the manufacture of thick products, of which the thickness is at least 100 mm, or preferably at least 125 mm.

Example

In this example, 16 kg of aluminum as alloy AA5182 were melted in a crucible.
The molten metal was held at a temperature of 700+5° C. throughout the test.

The hydrogen content was measured using an Alscan™ apparatus, used always outside the periods of ultrasound treatment so as not to disturb the operation of the probe. The surface of the molten metal was swept permanently by argon at a rate of 5 l/min. No degassing or stirring was carried out.

Ultrasound treatments were carried out using a 500 W ultrasound transmitter at a frequency of 18 kHz. Samples were taken a few minutes after each treatment. Treatment times were considered cumulatively: a first 2 min treatment was performed; a second 4 min treatment was performed, which corresponds to a treatment time of 2+4=6 min, etc.

The microporosity of the samples taken in the shape of solidified slugs at a speed representing that of a rolling slab or an extrusion billet, was characterized by optical microscopy. The micrographs are shown in FIGS. 1a to 1e and 2a to 2e.

The micropores dimension of these samples was measured by X-ray tomography after 12 hours' homogenization at a temperature of 505° C., which makes it possible to calculate the volume fraction of microporosity and the density of pores of size greater than 90 µm, 210 µm or 420 µm. Homogenization has the effect of increasing the micropores dimension.

The results are presented in table 1. The histogram of the number of micropores according to their dimension is presented in FIG. 3.

TABLE 1

| Duration of ultrasound treatment (minutes) | Micrograph | Hydrogen content (ml H$_2$/100 g) | Volume fraction of microporosity in homogenized state (%) | Density of pores of greater dimension (micropores/mm$^3$), in homogenized state | | |
|---|---|---|---|---|---|---|
| | | | | than 90 µm | than 210 µm | than 420 µm |
| 0 | FIG. 1a-FIG. 2a | 0.394 | 0.129 | 19.1 | 2.9 | 0.17 |
| 2 | FIG. 1b-FIG. 2b | 0.287-0.348 | | | | |
| 6 (4 + 2) | FIG. 1c-FIG. 2c | 0.341-0.348 | 0.145 | 22.8 | 3.1 | 0.13 |
| 14 (8 + 4 + 2) | FIG. 1d-FIG. 2d | 0.327 | 0.019 | 4.5 | 0.3 | 0 |
| 29 (15 + 8 + 4 + 2) | FIG. 1e-FIG. 2e | 0.314-0.302 | 0.004 | 1.2 | 0.07 | 0 |

The structures observed are presented in FIGS. 1 and 2 and show that in a rough-cast state, a very clear effect is observed for a 6-minute treatment at 500 W whereas no effect is detected for a 2-minute treatment at 500 W. In a homogenized state, a very clear effect is observed for a 14-minute treatment at 500 W, for which a reduction of more than 75% of micropores of size greater than 90 µm is to be noted.

The invention claimed is:
1. A manufacturing method for an unwrought aluminum alloy semi-finished product optionally comprising a rolling slab and/or an extrusion billet, said method comprising:
  (i) preparing a molten metal bath of an alloy having a composition comprising, percentage by weight:
    Zn: 0-12
    Cu: 0-6
    Mg: 0-6
    Li: 0-3
    Ag: 0-1
    Si<0.5
    Fe<0.5 optionally at least one of Cr, Zr, Mn, Hf, Ti, Sc, V, B, with a content <0.5,
remainder aluminum,
(ii) treating with ultrasound said molten metal bath in a furnace and/or a vessel using an immersed device comprising at least one ultrasound transmitter,
(iii) transferring said molten metal bath so treated to a solidification device,
(iv) vertical direct chill semi-continuous casting said treated molten metal bath,
wherein a duration elapsing between an end of said treating with ultrasound of the liquid metal bath and an introduction of said liquid metal bath in the solidification device is at least a few minutes and optionally comprises at least three minutes.

2. A manufacturing method for an unwrought aluminum alloy semi-finished product optionally comprising a rolling slab and/or an extrusion billet, said method comprising:
(i) preparing a molten metal bath of an alloy having a composition comprising, percentage by weight:
Zn: 0-12
Cu: 0-6
Mg: 0-6
Li: 0-3
Ag: 0-1
Si<0.5
Fe<0.5
optionally at least one of Cr, Zr, Mn, Hf, Ti, Sc, V, B, with a content <0.5,
remainder aluminum,
(ii) treating with ultrasound said molten metal bath in a furnace and/or a vessel using an immersed device comprising at least one ultrasound transmitter,
(iii) transferring said molten metal bath so treated to a solidification device,
(iv) vertical direct chill semi-continuous casting said treated molten metal bath,
wherein a semi-finished product obtained by said method has at mid thickness, a density of micropores of a size greater than 90 μm, that is less than 50% of a density of micropores of a size greater than 90 μm obtained by a method that is identical to said method but does not includes said treating by ultrasound.

3. A method of claim 2, wherein a semi-finished product obtained by said method has at mid thickness, a density of micropores of a size greater than 90 μm, that is less than 20% of a density of micropores of a size greater than 90 μm obtained by a method that is identical said method but does not include said treating by ultrasound.

* * * * *